(12) United States Patent
Monnes et al.

(10) Patent No.: US 8,428,609 B2
(45) Date of Patent: Apr. 23, 2013

(54) SYSTEM AND METHOD FOR MANAGING COMMUNICATIONS IN CELLS WITHIN A CELLULAR COMMUNICATION SYSTEM

(75) Inventors: Peter Monnes, Chelmsford, MA (US); Thomas A. Hengeveld, Hollis, NH (US)

(73) Assignee: Pine Valley Investments, Inc., Las Vegas, NV (US)

(*) Notice: Subject to any disclaimer, the term of this patent is extended or adjusted under 35 U.S.C. 154(b) by 170 days.

(21) Appl. No.: 12/431,530

(22) Filed: Apr. 28, 2009

(65) Prior Publication Data

US 2009/0275343 A1 Nov. 5, 2009

Related U.S. Application Data

(60) Provisional application No. 61/050,100, filed on May 2, 2008.

(51) Int. Cl.
*H04W 72/00* (2009.01)
*H04L 12/28* (2006.01)

(52) U.S. Cl.
USPC .......................................... 455/453; 370/389

(58) Field of Classification Search .................. 455/453, 455/447, 456.1; 370/229, 338
See application file for complete search history.

(56) References Cited

U.S. PATENT DOCUMENTS

| | | | |
|---|---|---|---|
| 5,946,625 A * | 8/1999 | Hassan et al. | 455/447 |
| 6,684,076 B2 | 1/2004 | McKenna et al. | |
| 7,269,657 B1 * | 9/2007 | Alexander et al. | 709/229 |
| 2005/0136943 A1 * | 6/2005 | Banerjee et al. | 455/456.1 |
| 2005/0246711 A1 | 11/2005 | Berstis et al. | |
| 2005/0278550 A1 * | 12/2005 | Mahone et al. | 713/189 |
| 2006/0112170 A1 | 5/2006 | Sirkin | |
| 2006/0136671 A1 | 6/2006 | Balakrishnan et al. | |
| 2007/0191054 A1 | 8/2007 | Das et al. | |
| 2007/0202907 A1 | 8/2007 | Shaffer et al. | |
| 2007/0218880 A1 * | 9/2007 | Felter et al. | 455/414.1 |
| 2008/0056125 A1 * | 3/2008 | Kneckt et al. | 370/229 |
| 2008/0240215 A1 * | 10/2008 | Nobukiyo et al. | 375/225 |
| 2008/0268864 A1 * | 10/2008 | Andersson et al. | 455/453 |
| 2009/0275341 A1 | 11/2009 | Monnes et al. | |
| 2009/0323528 A1 | 12/2009 | Loiacono et al. | |
| 2010/0278042 A1 | 11/2010 | Monnes et al. | |

FOREIGN PATENT DOCUMENTS

| | | |
|---|---|---|
| GB | 2379359 | 3/2003 |
| GB | 2379359 A | 3/2003 |
| JP | 2008092095 A | 4/2008 |

OTHER PUBLICATIONS

Information about Related Patents and Patent Applications, see section 6 of the accompanying Information Disclosure Statement Letter, which concerns Related Patents and Patent Applications.
International Search Report mailed Aug. 25, 2009, Serial No. PCT/US2009/002689, in the name of M/A COM, Inc.
Japanese Office Action dated Jun. 22, 2012; Application Serial No. 2011-507476 in the name of Harris Corporation.

* cited by examiner

*Primary Examiner* — Michael Faragalla
(74) *Attorney, Agent, or Firm* — Fox Rothschild, LLP; Robert J. Sacco (57) ABSTRACT

A system and method for managing communication in a cellular communication system are provided. The method includes measuring communication conditions within at least one communication cell of the communication system and estimating congestion within the at least one communication cell of the communication system based on the measured communication conditions. The method further includes adjusting communication links within the at least one communication cell based on the estimated congestion.

21 Claims, 4 Drawing Sheets

SYSTEM AND METHOD FOR MANAGING COMMUNICATIONS IN CELLS WITHIN A CELLULAR COMMUNICATION SYSTEM

CROSS REFERENCE TO RELATED APPLICATIONS

This application claims priority to and the benefit of the filing date of U.S. Provisional Application No. 61/050,100 entitled "System and Method for Managing Communications in a Cellular Communication System", filed on May 2, 2008 and which is hereby incorporated by reference in its entirety.

BACKGROUND OF THE INVENTION

The subject matter disclosed herein relates generally to cellular communication systems, and more particularly, to a system for managing voice over cellular data connections within one or more cells of a cellular communication system.

Cellular communication systems are used to provide voice and data communications between one or more communication units within the cellular communication system. The cellular communication units, for example, cellular telephones, mobile radios or other cellular devices allow communication between one or more users. A communication link may be established between two mobile cellular phone users allowing voice communications over the established communication link. The communication link may be provided using the Global System for Mobile Communications (GSM) standard that allows communication between different mobile telephones or radios.

Cellular data systems are also known that provide packet data communication capabilities that allow communication of voice and data. For example, the General Packet Radio Service (GPRS) standard may be used to communicate voice or other data in packets over a data channel. The voice and data may be communicated over a shared data channel. As another example, the Enhanced Data Rates for GSM Evolution (EDGE) standard may be used to provide higher speed data transmissions for particular applications.

In these different cellular communication systems, individual users may be able to communicate with a plurality of other users via a group call or other group connection. For example, in the Open Mobile Alliance (OMA) standard, users with mobile devices may communicate using a push-to-talk function, referred to as a push-to-talk over cellular (POC) function that allows users to communicate with different groups within a cellular communication system. Users may establish personal group lists or "buddy" lists on a cellular telephone and upon depressing a single button a user is able to establish a connection and communicate with or broadcast a message to multiple users. The multiple users may have been alerted to a request to join the connection.

The communications between devices corresponding to the personal group lists or "buddy" lists typically include small numbers of users or subscribers and the voice or data that is communicated is typically not time critical. Accordingly, if the particular cellular communication coverage area or communication cell in which a group communication is occurring becomes overloaded such that the capacity is exceeded (e.g., bandwidth exceeded) and some of the participants in the group call are unable to connect to the communication link (or some are dropped), those members of the group will not be able to participate in the communications. Thus, some group members will not be able to listen to the message or obtain the data transmitted over the group connection. However, because this type of personal communication is often not time critical, there are minimal consequences or no serious consequences resulting from such loss of connection or inability to connect by some users or subscribers. In other types of communication such as emergency group calls, loss of connection or inability to connect to a call can have serious (sometimes life threatening) consequences.

User equipment and other equipment external to the cellular core network are also not able to detect the amount of activity in a particular cell or determine an amount of usage relative to a maximum number of users, a maximum capacity or otherwise. Accordingly, the cellular communication system or network will not provide any type of notification or alert when the system is reaching or about to reach a maximum level or capacity. Accordingly, additional units attempting to establish a communication link using an overloaded cell, such as to join a group call, may not be able to join, and there will be no prior indication that such denial of access is about to occur. Moreover, there is no means to prevent such a denial from occurring. Thus, because there is no indication from the network of when a particular cell is reaching a maximum level or capacity, there is no way to control or otherwise reduce the likelihood that individuals or units attempting to connect with a particular uplink or downlink will not be able to access that uplink or downlink connection to join a group call.

BRIEF DESCRIPTION OF THE INVENTION

In accordance with an exemplary embodiment of the invention, a method for capacity management in a communication system is provided. The method includes measuring communication conditions within at least one communication cell of the communication system and estimating congestion within the at least one communication cell of the communication system based on the measured communication conditions. The method further includes adjusting communication links within the at least one communication cell based on the estimated congestion.

In accordance with another exemplary embodiment of the invention, a method for capacity management in a communication system is provided. The method includes initiating a congestion reporting process with a plurality of user equipment within a communication cell of the communication system and receiving congestion reports from the plurality of user equipment. The method further includes determining a count of a number of congestion reports from the user equipment indicating a congestion condition and controlling call legs within the communication cell based on the count of the number of congestion reports. The controlling of call legs includes at least one of denying additional call legs and terminating existing call legs.

In accordance with yet another exemplary embodiment of the invention, a wireless communication system is provided that includes a plurality of communication cells. The wireless communication system further includes a plurality of voice servers, with each of the plurality of communication cells assigned to one of the plurality of voice servers. At least one of the plurality of voice servers is configured to manage data traffic within at least one communication cell based on congestion reports received from a plurality of user equipment within the at least one communication cell.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between system components or hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
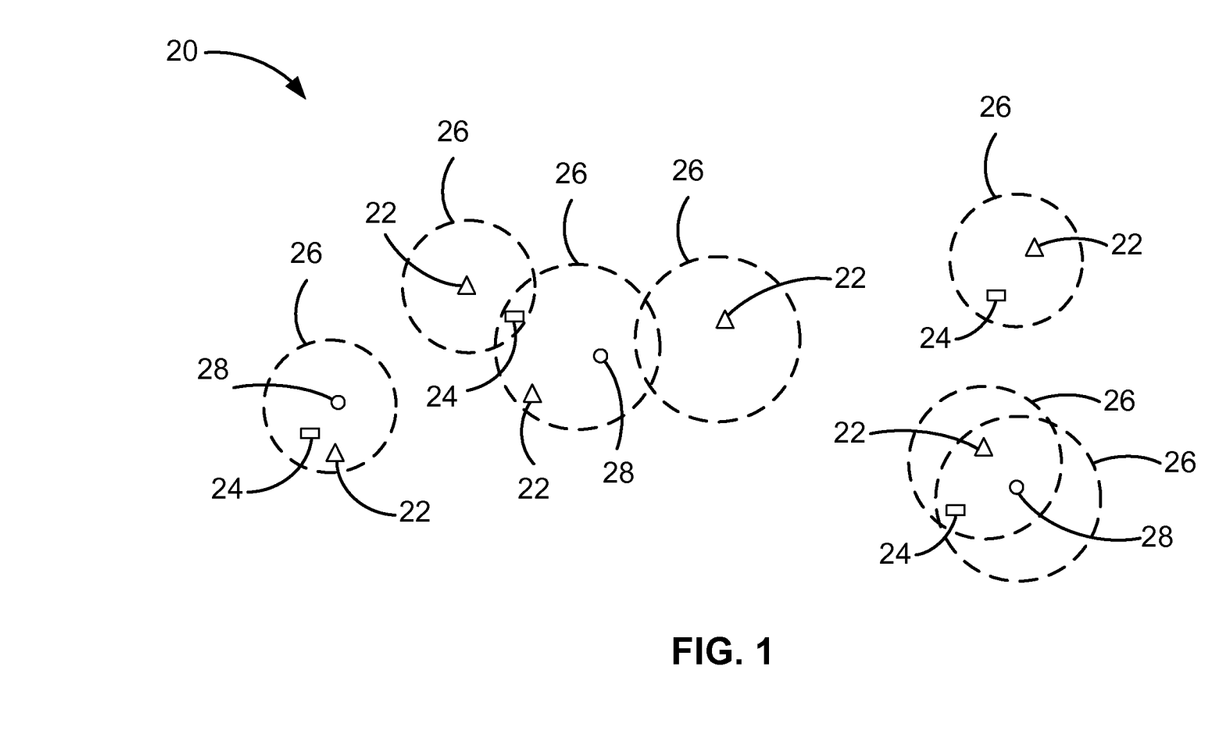
FIG. 1 is a block diagram of a cellular communication system in which communication connections are managed in accordance with various embodiments of the invention.

Various embodiments of the present invention provide for managing communication traffic within communication cells of a communication system. For example, the various embodiments provide for managing multiple cellular connections, and more particularly, cellular data connections (or call legs) within a cellular communication system 20 as shown in FIG. 1. The cellular communication system 20 includes a plurality of access points (APs) 22, which can comprise cellular network base stations and a plurality of voice servers 24. The APs 22 may be any type of access points are not just limited to system providing land-based communications, for example, public safety, public radio or group communications. The APs 22 may be part of communication systems providing sea-based or air-based communications.

Figure 2:
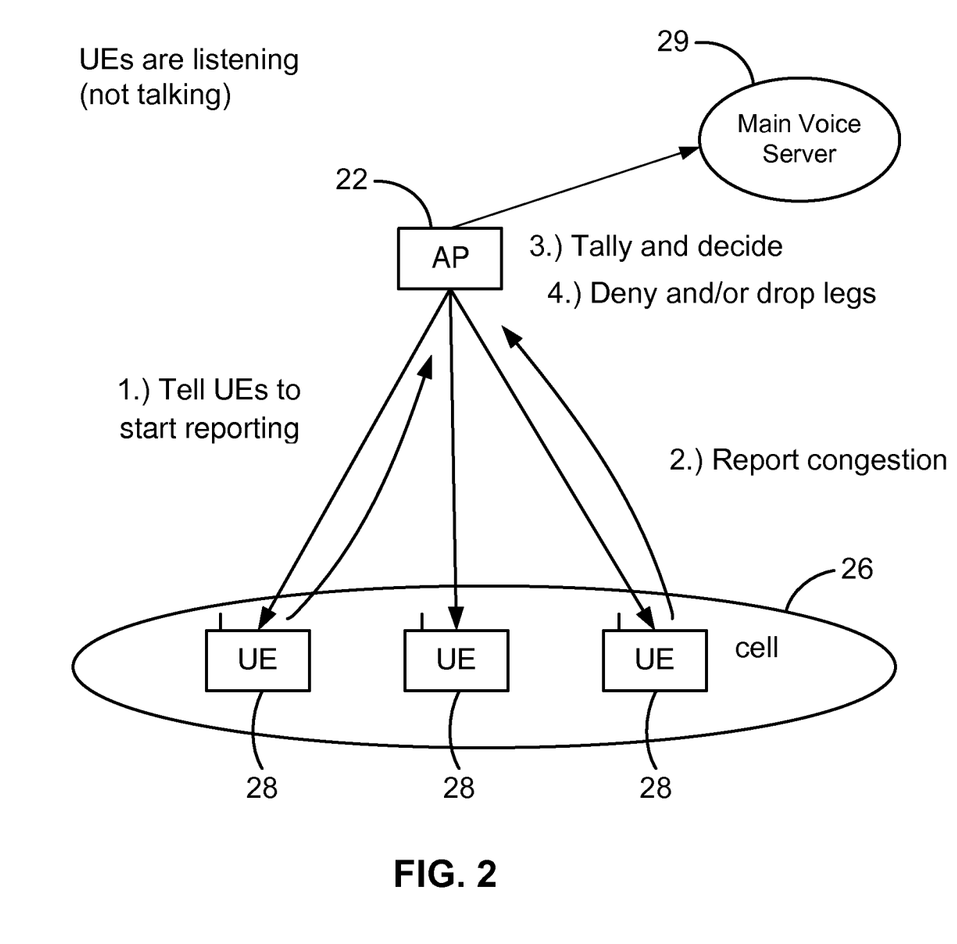
FIG. 2 a block diagram illustrating communication cell capacity management in accordance with various embodiments of the invention.

It should be noted that the voice servers 24 may be controlled by a main voice server 29 (e.g., a switch), shown in FIG. 2, such as a Voice Network Interface Controller (VNIC) server. Also, the voice servers 24 are shown to indicate that the voice servers 24 may be associated at different times with different cells and in one embodiment the voice servers are physically located a central data center (not shown). Each of the plurality of APs 22 has a corresponding cellular data network communication coverage area 26 (also referred to as a communication cell or cell). The cellular data network communication coverage areas 26 may be overlapping at some locations. The various embodiments of the invention as described herein allow one or more communication units, for example, user equipment (UE) 28 or other portable communication device to communicate with other UEs 28 by using broadcast or group messaging. For example, the UEs 28 may be land mobile radios configured to communicate over the cellular communication system 20 by transmitting and receiving cellular data communication packets using voice over cellular (VOC).

More particularly, various embodiments of the invention detect activity in a communication cell and determine when a maximum level or capacity is close to being reached or predict when that maximum level or capacity will be reached. The current conditions may be measured to estimate, for example, communication congestion within a communication cell and determine when or if the communication cell is or may become overloaded. Accordingly, based upon this estimation and a determination of particular users communication activity, which may include present activity information (e.g., active call(s) information), as well as historical information, management of different communication links within the cellular communication system 20 is provided. However, it should be noted that the various embodiments of the invention are not limited to managing communications with a cellular communication system, but may be implemented in connection with different communication networks or systems wherein, for example, current bandwidth usage is not available and an estimation of the usage is desired or needed. For example, communication congestion may be controlled in a WiFi communication system. Also, embodiments of the invention may be implemented in connection with different cellular networks, for example, an Enhanced Data Rates for GSM Evolution (EDGE) network, Code Division Multiple Access (CDMA) network, Universal Mobile Telecommunications System (UMTS) network or a W-CDMA (Wideband Code Division Multiple Access) network.

Because typical cellular communication systems, for example, Global System for Mobile Communications (GSM) systems have no broadcast capability, group communications will often heavily load the communication cells within the system network. Accordingly, priority communications may not be able to be accessed due to the congestion. Moreover, all communications may suffer poor quality of service during the congestion. As such, cell congestion is detected and the likelihood of a negative impact on a UE 28, for example, of the UE 28 being dropped from a group call or not being able to connect to a group call is reduced or eliminated by taking an action to reduce or lower the cell congestion level.

In particular, as shown in FIG. 2, various embodiments of the invention monitor a congestion level of a communication coverage area 26 (e.g., a cell) using or through APs 22. The general process for monitoring and controlling the congestion level in the communication coverage area 26 may be provided as follows:

1. The AP 22 requests UEs 28 to begin reporting communication connections within the cell.
2. The UEs 28 report communication congestion levels to the AP 22.
3. A determination is made based on a tally or count of the number of congestion reports from UEs 28 whether action is to be taken, which is based on a congestion level determined from the UE congestion report.
4. If the congestion level exceeds a predetermined level or criteria, call legs (connections or links) are denied and/or dropped (terminated).

It should be noted that the reporting from the UEs 28 may be provided using any suitable means that may enable the reporting functionality. For example, based on a log within a UE 28 as described in more detail below, reporting may be initiated. A congestion report message is provided to the AP 22 from the UEs 28. The messaging and procedures for the reporting may be modified based on the type of communication, system requirements, etc. For example, when a predetermined number of UEs 28 (e.g., 5 UEs) are listening within a cell, capacity management procedures are initiated and the UEs 28 send congestion reports to the AP 22. It should be noted that the AP 22 may also identify which packet sequence number started the monitoring process. Additionally, it should be noted that when the number of UEs 28 falls below the predetermined level, the reporting of congestion by the UEs 28 stops.

Figure 3:
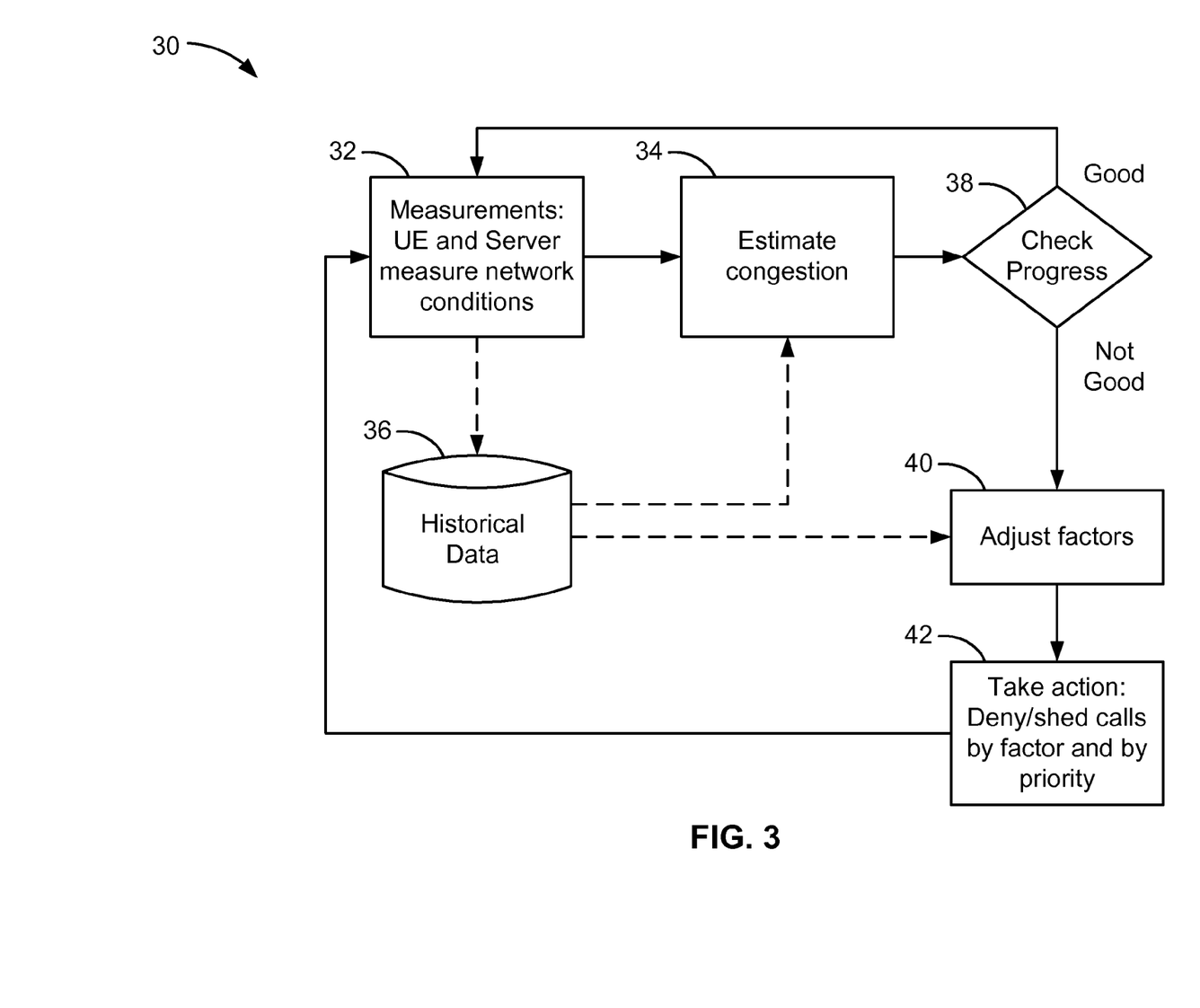
FIG. 3 is a flowchart of a method for providing capacity management in accordance with various embodiments of the invention.

More particularly, monitoring a congestion level of a communication coverage area (e.g., a cell) may be provided by the method 30 illustrated in FIG. 3. The method 30 provides a process for capacity management for wireless communications, such as cellular communications in the cellular communication system 20.

Specifically, the method 30 determines or makes measurements of user and network conditions at 32, such as based on congestion reporting from the UEs 28. For example, measurements may be obtained from the UEs 28 or from one or more servers, such as the voice servers 24 (shown in FIG. 1) having information stored regarding current use/activity or historical use/activity. The UEs 28 may log statistical information such as failed or delayed connection attempts, times for such failure or delay, reason for the failure or delay, location ports/cell ID corresponding to the failure or delay, signal strength, duration of communications, time between communications, etc. The UEs 28 then may send a log (or message) to a server or the AP 22, which log may be sent periodically, for example, at different points in time, such as at some configurable time of day or a configurable time after failure (to avoid congestion). However, other transmission times are contemplated. For example, the log may be sent on demand (e.g., based on a request or self-initiated by the UE 28) or as soon as possible after a particular logged event. It should be noted that when reference is made herein to UEs 28, this refers to any type of device capable of communicating within, for example, the cellular communication system 20, such, a cellular telephone, a handset, a radio, a terminal, etc.

Referring again to FIG. 2, at 32, the server can also measure different network conditions. For example, the server may measure jitter across heartbeat signals (e.g., data pulses to maintain data link connection) of all the UEs 28 or jitter across all current call legs (e.g., current call connections). A call leg is generally defined as a link between a UE 28 and a server, for example, the voice server 24 (both shown in FIG. 1). Additional or optional measurements also may be obtained by the network, for example, access time per call set-up and the number of registered users within the cell. However, it should be understood that the measurements obtained by the UEs 28 and by the server may be of any type as desired or needed. Additionally, the measurements may be obtained based upon a network type. For example, different measures may be made if the system is an EDGE network versus a UMTS network. Additionally, measurements can be made at different time intervals, which can be anywhere from sub-minute frequency to sub-second frequency. Also, different types of measurements may be made, such as variance in arrival rate, etc. In other words, the variance in arrival rate may be determined by measuring the time between the arrival of each of a plurality of data packets at one or more of the UEs 28. In some embodiments, if there are no communications within a particular communications cell for a particular time period (e.g., several seconds), the system may pulse or ping the UEs 28 within a particular communications cell to determine a success rate of communication. For example, a group ping may be provided to all UEs 28 within a particular communication cell communication coverage area 26 defining one or more communication cells.

After making the measurements at 32, the congestion within one or more communication cells within the cellular communication system 20 is estimated at 34. This estimation may include, for example, calculating the maximum number of call legs (e.g., call connections) within a particular communication cell, which may include maintaining a log of the highest number of observed call legs per communication cell. Moreover, and for example, if a plurality of users are in a particular communication cell, the ping message (as described above) or other pulse may be communicated, which may be referred herein as a test pulse, to measure the potential maximum call legs currently within a particular communication cell.

It should be noted that as part of the estimation, historical data that is determined and stored at 36, which may be based in part on the measurements at 32, may be used as part of the estimation. Thus, the estimation at 34 includes not only the current activity, but also uses historical data to predict, for example, behavior for particular users. The estimation may determine that based on a user's activity, which may be developed into a user's activity profile, the user is likely to establish a call or communication link within a certain time period range (e.g., within the next 3 minutes to minutes, or within the next 5 minute to 15 minutes, etc.). The user's profile may also be accessed to determine what type of call may be likely, for example, whether the call is likely to be to a single other user or multiple users (e.g., a group call) and the priority level for that call, as well as the number of calls the user has made recently or historically. These predications or estimations may be made using any known predictive or estimation methods, including, for example, simulations (e.g., Monte Carlo simulations), tests, etc.

As part of the estimation of congestion at 34, a historical correlation between measured performance and congestion may be determined. For example, a historical correlation between measured heartbeat jitter, call spread jitter, access time, variance in arrival rate, etc. may be correlated with congestion including failed attempts logged by the UEs 28, etc. Based upon the current activity and stored historical data, the estimated congestion may predict a particular congestion level, for example, a congestion severity level for the particular communication cell given different factors including congestion versus performance history, a maximum number of call legs, a number of units currently in the cell, each user's historical behavior, time of day, etc. as described above. For example, different severity levels may result in different factors being adjusted and actions taken (e.g., remedial actions) as described below.

After the congestion estimation at 34, a determination is made at 38 as to whether the current communication cell and any actions previously taken by the system have improved the conditions within the communication cell. For example, a determination may be made as to the progress of any actions that may have been taken within the communication cell based upon the estimated congestion at 34 and the level of congestion severity. If a determination is made at 38 that the communications and congestion within the communication cell are at an acceptable level or a good level (e.g., at a predetermined level below an overload condition), then the system again continues to obtain measurements at 32 and monitor the system.

However, if at 38 it is determined that the communications within the cell are continuing to deteriorate or become more congested, then corrective actions or adjustments may be made at 40. Essentially, the level of actions taken to reduce congestion may be adjusted based on the results of previous actions taken. For example, if the system determines that the current congestion level (or other conditions) as determined at 34 is similar to a previously determined congestion level at 34 (or other conditions), the system may determine whether the same of different action should be taken. For example, the level of congestion may be separated into different levels of severity such as a green level, yellow level, orange level and red level, which are in increasing order of severity of congestion. If a previous action taken during an orange level condition resulted in the congestion staying at the orange level or increasing to the red level, then additional actions may be taken (e.g., additional actions to reduce bandwidth congestion) because not enough action was previously taken. However, if a previous action taken during an orange level condition resulted in the congestion reducing to the green level, then less action may be taken (e.g., less action to reduce bandwidth congestion) because too much action was previously taken. Thus, by assessing different previous actions that were taken by the system a current action may be adjusted at 40.

Accordingly, based upon the determined level of action taken to address the congestion, an adjustment may be made if the congestion level persists or if the congestion level disappears too quickly, indicating that not enough action was previously taken or too much action was previously taken, respectively. Moreover, different levels of adjustment may be provided, for example, if a determination is made that in general the actions taken are not enough to reduce the congestion or if there are localized problems at a particular communication cell level.

Based on the determined adjustment of factors at 40 that should be taken, particular actions are taken at 42 to make the adjustment of the factors. For example, different actions may be taken based upon the severity level of the congestion. A table or other matrix may be used that indexes the different actions into an action table, which may list in order of severity the service to impact and the type of impact that is to be taken based upon the adjustments determined at 40. For example, the type of impact may include degrading service quality to the overall system, degrading service quality to a particular UE 28 (shown in FIG. 1), denying access to a new UE 28, interrupting service to one or more UEs 28, etc. For example, action may be taken based on the table below.

TABLE 1

| Current Estimated Congestion Level | Action To Be Taken |
|---|---|
| Green Level | No action. |
| Yellow Level | Deny new low priority connections. |
| Orange Level | Deny new medium and low priority connections and drop low priority connections. |
| Red Level | Deny any new connections except priority connections and drop medium and low connections. |

Thus, the actions taken, and in particular, which call legs to drop (or which new call legs to deny) may also be based upon the priority of the call, such as whether it is an emergency call, and also that the particular UE 28 making the broadcast or group call. For example, a priority list may be defined as follows: 1) All call, 2) Emergency on P1, 3) Emergency on P2, 4) Emergency on Select, 5) Emergency on P3, 6) Announcement, 7) icall, 8) P1, 9) P2, 10) Select, 11) P3, 12) Data call and 13) PSTN.

It also should be noted that similar actions may be taken to add legs to a cell. For example, if there is an extended period of no congestion, the AP 22 may add new legs at a faster pace.

Thus an action table may be created, such as shown in Table 1, based upon different levels of congestion within a system, which may be, for example, a green level for a communication cell that is not congested, a yellow level for a communication cell that is starting to become congested, an orange level for a communication cell that is becoming even more congested, and a red level for a communication cell that has almost reached maximum capacity.

In general a set of criteria may be used to determine which UEs 28, calls or call legs to drop. In some embodiments, UEs 28 with the lowest priority are first dropped, such as based on the type of UE 28 (e.g., emergency LMR versus personal radio). Different call conditions also may affect whether a UE 28 is dropped. For example, if the signal strength for a UE 28 is below a predetermined level (e.g., below a predetermined signal strength) then the priority of the UE 28 in the priority list may be lowered a predetermined number of levels (e.g., 5 levels). After the least priority UEs 28 are dropped, then legs on a lower priority group and lower priority users are dropped. Thereafter, other conditions relating to the call leg may be used to determine which legs to drop. For example, thereafter the call with the longest duration may be dropped followed by the UEs 28 that are newest to the cell.

If two or more call legs are on the same call and have the same priority, the call leg that has received the most number of communication packets during the current call is dropped first in some embodiments. The call leg that has received the most number of communication packets typically has the least number of communication packets still queued in the network.

Thus, when congestion is detected on a downlink, one or more call legs may be dropped. For example, if half the UEs 28 report congestion and there are more than a predetermined number of UEs 28 (e.g., 10 UEs 28), then a predetermined percentage (e.g., 10 percent) or predetermined number of legs (e.g., 1 leg) are dropped as described in more detail herein, such as based on the priority of calls. It should be noted that different actions may be taken based on the level of congestion. For example, if a predetermined number of UEs 28 (e.g., more than half the UEs 28 in a cell) are reporting severe congestion, a higher predetermined percentage (e.g., 20 percent) or higher predetermined number of legs (e.g., 2 legs) are dropped. Additionally, requests for new call legs from new UEs 28 (e.g., emergency, late join, new call, etc.) may be added and other call legs dropped based on a level of priority of the call leg, such as an emergency call leg.

Additional information also may be used to provide capacity management. For example, information from adjacent or adjoining communication cells within the communication system may be used. For example, in some communication systems signal strength of neighboring communication cells may be used to determine whether or not to move a particular call to another cell. However, it should be noted that in some systems, for example, GSM, it is presently not possible to move a call to another cell as described above. Thus, in systems that allow movement of a call to another cell, the system may drop a connection (call leg) to a UE 28 and re-connect into a communication cell that has less congestion, but with adequate or acceptable signal strength.

It further should be noted that during times of high congestion, for example, when a determination is made that the system is at a level that is near maximum capacity and adjustment factors are to be taken (e.g., the orange or red level), the actions taken may result in some or all group members not being able to obtain a connection to a group call that is in progress. In such circumstances, where action is to be taken to deny or drop calls, and some of the users will be unable to connect to the call, or are dropped from the call, the users may a later point in time optionally receive a recording of the call.

Figure 4:
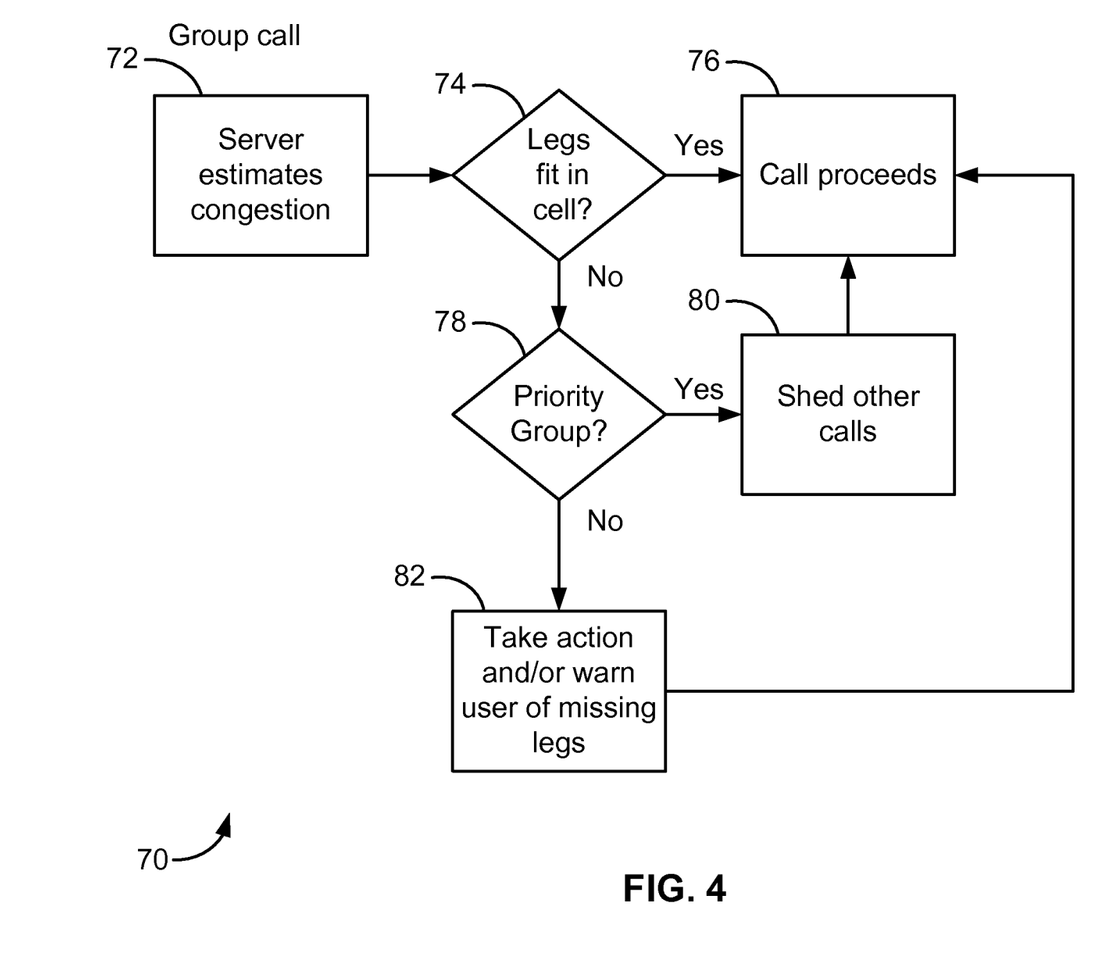
FIG. 4 is a flowchart of a method for managing a congested cell in accordance with various embodiments of the invention.

Accordingly, and as shown in FIG. 4, a method 70 for managing a congested cell may include a server, such as the voice server 24 (shown in FIG. 1) estimating congestion of a communication cell at 72. The server may estimate a current congestion level based on a particular group call and determine what action should be taken. Specifically, a determination is made at 74 as to whether the current number of legs (e.g., communication links based on the number of active devices participating in the call) fit within the communication cell, for example, whether the available bandwidth or capacity is sufficient to maintain the communication cell at an acceptable congestion level. If a determination is made at 74 that the current number of legs or an anticipated number of legs will fit within the communication cell, for example, the number of communication links will not exceed the maximum capacity of the communication cell and a congestion level is not exceeded, then the group call proceeds at 76.

However, if a determination is made at 74 that the number of legs do not or will not fit in the cell then a determination may be made at 78 as to whether the group is a priority group. A determination may be made as to whether the communications for the particular group are a priority, such as emergency calls. Other priority communications might be time sensitive or time critical communications, in which information not provided in a timely manner could result in adverse consequences.

For example, when a crane operator is making a group call to others within the work area to identify when and where the crane will be moved, this type of information may be deemed as priority and thus a priority group. Other priority calls may be made between emergency personnel such as the police or fire department during a particular time. If a determination is made at 78 that the group is a priority group or the call is a priority call, then at 80, some or all other calls within the communication cell are dropped or otherwise transferred to other communication cells. As described herein, the dropped users may receive notification of the drop and/or a subsequent recorded message of the content missed after the drop. Alternatively, the communication may be delayed instead of dropped. Thereafter the call proceeds at 76. If a determination is made at 78 that the group is not a priority group, then at 82 one or more actions may be performed to reduce the congestions, for example, other than dropping or terminating call legs. For example, particular calls may be delayed or transmitted at lower rates, thereby degrading the call quality of some of the call legs. Users also may be warned at 82 that some legs are missing, such that certain users are not able to connect with the call. For example, these users on the missing legs may not be allowed to connect.

The different functions and operations may be divided between different portions of the system or may be dedicated to certain portions. Monitoring may be enabled and congestion detected in different ways as described herein. The AP 22 then takes actions (e.g., deny or drop legs) and subsequently can take further action (e.g., add back legs) to maintain cell congestion below a predetermined maximum where communications are affected (e.g., call quality lowered or delayed).

Procedures for the UEs 28, such as reporting procedures may be defined in different ways. For example, different types of information may be reported from the UEs 28.

Also, the UEs 28 may begin congestion monitoring and report congestion condition based not on a request from an AP 22, or independently, for example, based on a current call condition. Also, it further should be noted that certain congestion reports may be disregarded, for example, if the congestion reports are in data packets having packet sequence numbers pre-dating a previous action taken by the AP 22.

Thus, a method of detecting congestion at a communication cell level and for freeing capacity dynamically based upon, for example, current congestion information, historical network information and user behavior is provided wherein the AP 22 uses parameters to control the number of call legs based on reports from one or more UEs 28 and as controlled by the main voice server 29. Various embodiments may also degrade service based upon service priority and/or may ensure that all group call members obtain voice packets with minimum delay. Thus, based upon the particular users within a particular communication cell, and the behavior of individual users or groups of users, which may the current behavior or past behavior of a particular user or group of users, future use may be predicted and adjustments may be made. Accordingly, the various embodiments can detect packet transfer congestion and use this information to manage airtime usage.

Modifications and variations to the various embodiments are contemplated. For example, a visualization tool or user interface, such as a graphical user interface may be provided to allow a user to view congestion reports, etc. to determine if congestion exists or is likely to exist, such as by recognizing patterns in the congestion data.

The various embodiments or components, for example, the cellular communication system or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for capacity management in a communication system, the method comprising:
   determining if a predetermined number of first network nodes are listening within a cell;
   if it is determined that said predetermined number of first network nodes are listening within said cell, then initiating capacity management operations including
   periodically communicating a plurality of congestion reports from a plurality of first network nodes within a communication cell of the communication system to a second network node in said communication cell, each of said plurality of congestion reports comprising information specifying a user communication activity,
   estimating, by the second network node, a current level of overall congestion within the communication cell of the communication system based on a content of said plurality of congestion reports,
   predicting, by the second network node, a future level of overall congestion within the communication cell of the communication system based on a content of said plurality of congestion reports, and
   adjusting communication links within the communication cell based on said estimated current level of overall congestion and said predicted future level of overall congestion;
   if it is determined that said predetermined number of first network nodes are not listening within said cell, then ceasing performance of at least one of said capacity management operations;
   wherein said information specifies at least one of a number of failed or delayed connection attempts, a time for each of said failed or delayed connection attempts, a duration of each of a plurality of communications, and a time between communications.

2. A method in accordance with claim 1, further comprising measuring at least one condition of user equipment within the at least one communication cell.

3. A method in accordance with claim 2 further comprising storing the measured at least one condition as historical data.

4. A method in accordance with claim 1, further comprising measuring at least one network condition within the communication cell.

5. A method in accordance with claim 4, wherein the at least one network condition comprises a variance in arrival rates of a plurality of data packets received by at least one user equipment in the communication cell.

6. A method in accordance with claim 4 wherein the at least one network condition comprises signal strength.

7. A method in accordance with claim 4, wherein the at least one network condition comprises an available capacity of the communication cell.

8. A method in accordance with claim 7, wherein the available capacity is determined by transmitting a ping message within the communication cell to identify user equipment within the communication cell.

9. A method in accordance with claim 1, wherein the estimating of said level of congestion further comprises using one of historical network communication data and past user communication behavior to determine a congestion level.

10. A method in accordance with claim 1 wherein the adjusting communication links further comprises assessing past adjustments based on past estimations of congestion to determine a current adjustment.

11. A method in accordance with claim 1, wherein the adjusting communication links further comprises at least one of denying new connections to the communication cell and dropping existing connections with the communication cell based on an estimated congestion level.

12. A method in accordance with claim 1, wherein the adjusting comprises using (i) a congestion report, from at least one user equipment in the communication cell, that identifies past communication conditions for the user equipment and (ii) current communication conditions for the communication cell to determine one of an amount and type of adjustment to be performed.

13. A method for capacity management in a communication system, the method comprising:
   determining if a predetermined number of user equipments are listening within a cell;
   if it is determined that said predetermined number of user equipments are listening within said cell, then initiating a congestion reporting process with a plurality of user equipment within a communication cell of the communication system;
   receiving a plurality of congestion reports from the plurality of user equipment, each of said plurality of congestion reports comprising statistical information specifying a user communication activity;
   determining a count of a number of said plurality of congestion reports from the user equipment indicating a congestion condition;
   predicting an anticipated number of call legs within said communication cell for a future time period based on said statistical information;
   controlling call legs within the communication cell based on the count of the number of said plurality of congestion reports and said anticipated number of call legs, the controlling including at least one of denying additional call legs and terminating existing call legs; and
   ceasing said congestion reporting process when less than said predetermined number of user equipments are listening within said cell;
   wherein said statistical information specifies at least one of a number of failed or delayed connection attempts, a time for each of said failed or delayed connection attempts, a duration of each of a plurality of communications, and a time between communications.

14. A method in accordance with claim 13, wherein the plurality of congestion reports are based on a variance in arrival rate for packets at each of the plurality of user equipment.

15. A wireless communication system comprising:
   a plurality of communication cells;
   a plurality of voice servers, each of the plurality of communication cells assigned to one of the plurality of voice servers and wherein at least one of the plurality of voice servers is configured to receive a plurality of congestion reports from a plurality of user equipment within at least one communication cell of the plurality of communication cells when a predetermined number of said user equipments are listening with in said communication cell, wherein each of said plurality of congestion reports comprises statistical information specifying a user communication activity; and
   a database managed by at least one of the plurality of voice servers, said database configured for storing said statistical information;
   wherein at least one of the plurality of voice servers is configured to predict a future level of congestion based on said statistical information stored in said database and manage data traffic within at least one communication cell based on said statistical information and said predicted future level of congestion;
   wherein said statistical information specifies at least one of a number of failed or delayed connection attempts, a time for each of said failed or delayed connection attempts, a duration of each of a plurality of communications, and a time between communications.

16. A wireless communication system in accordance with claim 15, wherein the plurality of congestion reports are based on a variance in arrival rate of packets at each of the plurality of user equipment.

17. A method in accordance with claim 1, wherein said predicting step comprises determining an anticipated number of call legs within said communication cell.

18. A method in accordance with claim 1, wherein said predicting step includes predicting a future communication behavior for a particular user associated with at least one of said first network nodes.

19. A method in accordance with claim 18, further comprising:
   storing, by said second network node, a user activity profile comprising historical communication data associated with said particular user; and
   updating, by said second network node, said historical communication data, based on at least one of said plurality of congestion reports;
   wherein said predicting step comprises predicting said future communication behavior based on said updated historical communication data.

20. A method in accordance with claim 18 wherein said predicted future communication behavior comprises at least one of a predicted time period for establishing a communication link, predicted type of call, and a predicted priority level.

21. A method in accordance with claim 4, further comprising:
   determining, by said second network node, a historical correlation between said estimated level of congestion and said at least one network condition;
   wherein said predicting step comprises predicting said future level of congestion based on said historical correlation; and
   wherein said at least one network condition comprises at least one of heartbeat jitter, call spread jitter, access time, variance in arrival rate, maximum number of call legs, number of units currently in the cell, historical user behavior, and a time of day.

* * * * *